United States Patent [19]

Gritter et al.

[11] Patent Number: 5,633,790
[45] Date of Patent: May 27, 1997

[54] DV/DT LIMITING OF INVERTER OUTPUT VOLTAGE

[75] Inventors: David J. Gritter, Racine; Jeffrey A. Reichard, Elm Grove, both of Wis.

[73] Assignee: Eaton Corporation, Cleveland, Ohio

[21] Appl. No.: 374,013

[22] Filed: Jan. 18, 1995

[51] Int. Cl.⁶ .................................................. H02P 5/34
[52] U.S. Cl. .................................................. 363/55
[58] Field of Search ........................ 361/118; 363/55–56, 363/57–58, 137, 135, 136, 138, 132, 133

[56] References Cited

U.S. PATENT DOCUMENTS 4,843,515   6/1989   Richman ..................... 361/58
5,461,556  10/1995   Horie et al. ................. 363/58
5,483,140  11/1996   Hess et al. .................. 318/802

FOREIGN PATENT DOCUMENTS 2189952   4/1987   United Kingdom .

*Primary Examiner*—Aditya Krishnan
*Attorney, Agent, or Firm*—Jennifer M. Stec

[57] ABSTRACT

A voltage rise limiting circuit (10) for use in conjunction with an inverter-driven induction motor (14). The circuit (10) includes capacitors (C4, C5, C6) connected in a delta configuration, with each node (64, 66, 68) coupled between an inductor (L7,L8,L9) and an input line of a diode bridge rectifier. The rectifier clamps positive voltage levels, putting trapped energy back into the dc inverter bus.

7 Claims, 3 Drawing Sheets

DV/DT LIMITING OF INVERTER OUTPUT VOLTAGE

BACKGROUND AND SUMMARY OF THE INVENTION

This invention relates generally to inverter-driven induction motor systems and, more particularly, to a dv/dt limiting circuit for controlling the rate of rise of inverter output voltage.

Adjustable frequency drives for controlling the speed of an induction motor are well known. Such drives often comprise a static inverter for converting a direct current (dc) input signal into an alternating current (ac) output signal having a frequency controllable by the user. These inverters may be of several types, one common type including power switching elements such as insulated gate bipolar transistors (IGBTs) gated by firing signals from a pulse width modulator.

However, such IGBT-based inverters generate rise rates in output voltage reaching up to 15,000 volts/μsec. This shows up at the motor input as a high peak voltage, due in part to impedance mismatch between the motor and cable, combined with long cables connecting the motor and drive. While this may have a negligible effect at very short cable lengths, on relatively long cables the PWM pulses can act as impulse waves on the motor cable resulting in reflection phenomena. This can cause the peak voltage at the motor to approach a theoretical limit of two times. Such high peak voltages and the associated currents caused by high rise rates can have detrimental effects on the motor such as causing bearing failure or a failure in the motor windings. Large peak voltages occurring repeatedly over the cycle of the PWM waveform create stresses on the insulation of the motor stator winding. Also, a high frequency "ringing" waveform appears at the front and rear of each pulse, contributing to transient voltage amplitudes.

The dv/dt limiting circuit of the present invention addresses this problem by controlling inverter output to limit voltage rise rates to between 500 and 1500 volts/μsec. This rise rate is low enough to allow reasonably long cabling between the inverter and motor without introducing the high peak voltages that would otherwise be introduced by the distributed inductance and capacitance inherent in the cable.

The present circuit is coupled between the inverter and motor and includes three capacitors connected in a delta configuration with each node connected between an inductor and a diode bridge rectifier input. Outputs from the bridge rectifier are passed through a resistor/capacitor circuit to return trapped energy to the inverter dc bus and to control peak output voltage. A large dc capacitor stores trapped inductor energy when an output contactor is opened.

These and other features and advantages of the present invention will become apparent upon review of the following specification taken in conjunction with the accompanying drawings.

DETAILED DESCRIPTION OF THE PREFERRED EMBODIMENT

Figure 1:
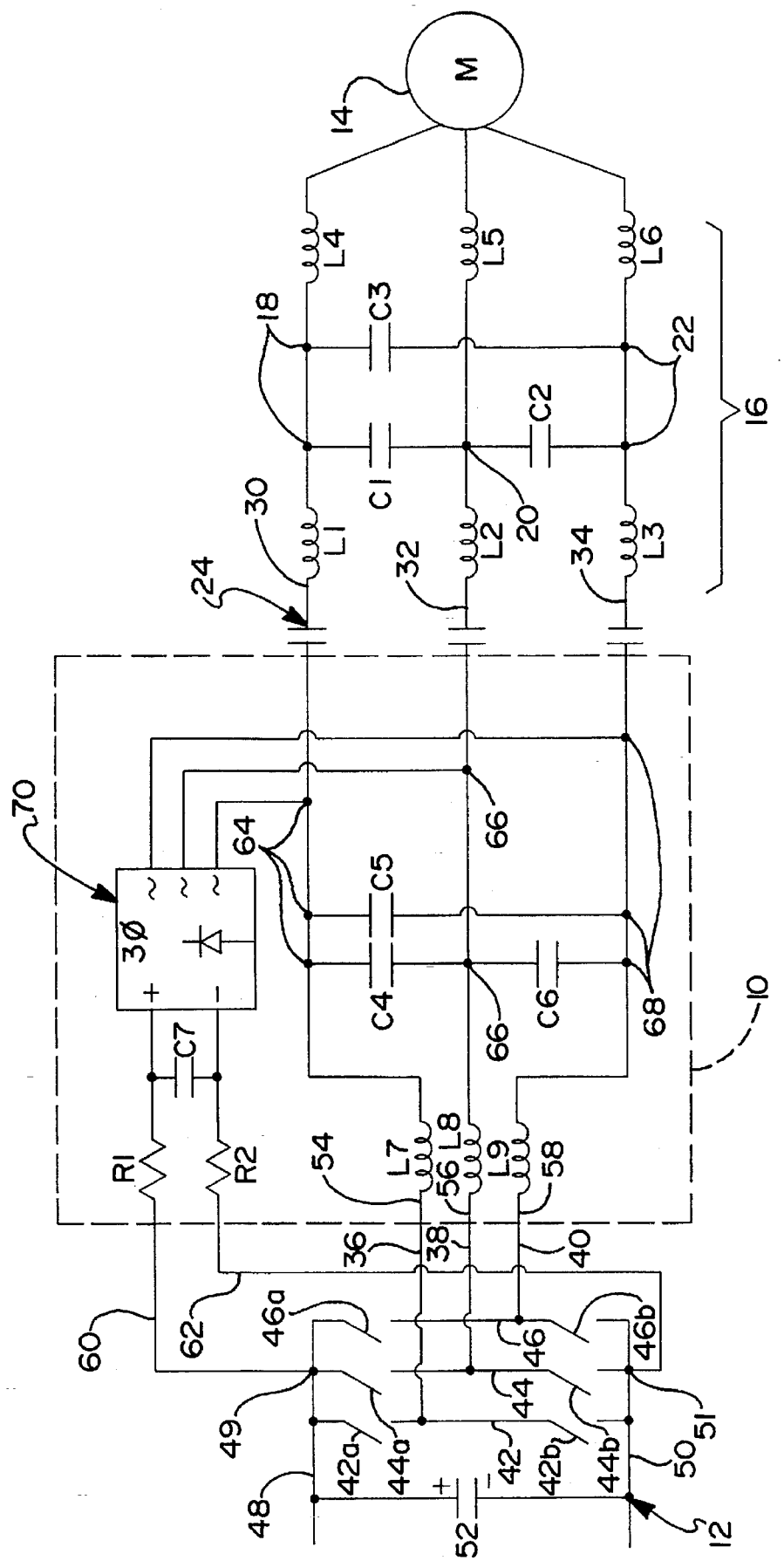
FIG. 1 is a schematic illustration of the limiting circuit of the present invention, as implemented in a typical application.

Turning now to the drawings and in particular to FIG. 1, the limiting circuit of the present invention is indicated generally at 10. Circuit 10 is connected between an inverter 12 and an ac induction motor 14 adapted to operate on a load (not shown). Circuit 10 is electrically connected to motor 14 by a conductive cable 16. The distributed capacitances and inductances of cable 16 are modeled as capacitors C1, C2 and C3 connected in a delta configuration between series connected inductors L1 and L4 at node 18, between L2 and L5 at node 20 and between L3 and L6 at node 22. Cable 16 is connected to circuit 10 output contactor 24 via modeled lines 30, 32, 34.

The inputs to limiting circuit 10 are provided from output lines 36, 38 and 40 of inverter 12. These inverter output lines are connected to limiting circuit input lines 54, 56 and 58, respectively. Inverter output line 36 is connected to inverter line 42 intermediate a pair of switches 42a and 42b. Inverter outputs 38 and 40 are connected in a similar fashion to inverter lines 44 and 46, respectively. Switches 42a, 44a, 46a, 42b, 44b, 46b are preferably power switching elements such as insulated gate bipolar transistors (IGBTs) which are alternately switched on and off by firing signals from a separately connected element such as a micro-processor based pulse width modulator (not shown). A dc voltage is supplied across bus lines 48 and 50 via a voltage source 52. Inverter 12 is thus adapted to convert dc power applied by power supply 52 to polyphase alternating current necessary to power motor 14.

If limiting circuit 10 were not included, inverter output lines 36, 38, 40 would be directly coupled to cable lines 30, 32, 34. However, this conventional configuration has several inherent disadvantages, the most notable of which is a high voltage rise rate and peak voltage to the distributed capacitances and inductances of cable 16, as modeled in FIG. 1. This not only adversely affects motor 14 but also limits the length of cable 16.

Limiting circuit 10 counteracts such effects and raises cable length limits by limiting the rate of rise of voltage at the cable input and clamping positive voltage levels and returning trapped energy back onto dc bus lines 48 and 50. Circuit 10 receives inputs on lines 54, 56 and 58 from inverter outputs 36, 38 and 40. Circuit 10 also includes output lines 60 and 62 connected to inverter 12 at nodes 44a and 44b, or the junctions at which line 44 joins bus lines 48 and 50, respectively. Input signals received on input lines 54, 56, 58 are passed in series through a corresponding inductor L7, L8, L9. Inductor L7 is connected at node 64 to parallel capacitors C4 and C5. Inductor L8 is connected at node 66 to parallel capacitors C4 and C6 and L9 at node 68 to C6 and C5, capacitors C4, C5 and C6 being connected in a delta configuration.

Figure 2:
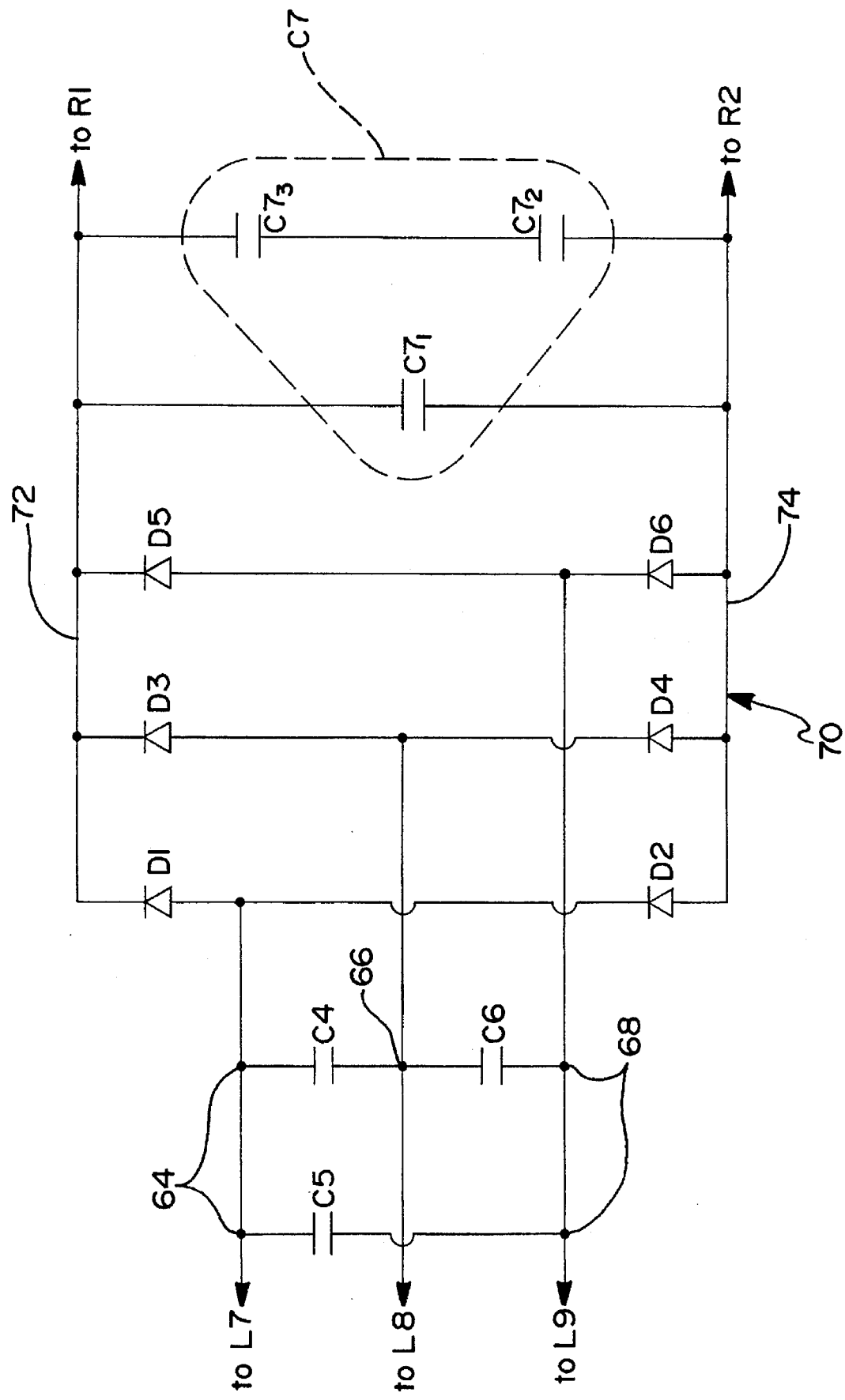
FIG. 2 is a more detailed view of a portion of the present limiting circuit.

Each of nodes 64, 66, 68 is electrically connected to an output of a fast recovery three-phase diode bridge rectifier 70. Rectifier 70 produces dc output signals to lines 60 and 62 and therefore connected nodes 49 and 51. Lines 60 and 62 each include a resistor, R1 and R2 respectively, having a capacitor C7 connected therebetween. FIG. 2 illustrates limiting circuit 10, and in particular rectifier 70, in additional detail. As shown therein the input to rectifier 70 comes from nodes 64, 66 and 68 with capacitors C4, C5 and C6 connected therebetween. Node 64 is electrically coupled to line 72 through diode D1 and to line 74 through diode D2. Similarly, node 66 connects to line 72 through diode D3 and to line 74 through diode D4. Finally, node 68 is coupled to line 72 through diode D5 and to line 74 through diode D6. Lines 72 and 74 provide dc current to resistors R1 and R2 with capacitor C7 connected therebetween.

Capacitor C7 preferably includes a set of three capacitors $C7_1$, $C7_2$, and $C7_3$ interconnected as shown in FIG. 2. Capacitor $C7_1$, in this exemplary embodiment, preferably having a capacitance of about 0.1 microfarads provides a path for high frequency currents, thus controlling the peak voltage which is clamped by the capacitors and rectifier bridge. Capacitors $C7_2$ and $C7_3$ are electrolytic capacitors which do not have the high frequency characteristics necessary to allow operation absent $C7_1$ but which, in series, have a voltage rating higher than can be normally attained with a single commercially available capacitor. The capacitances of $C7_2$ and $C7_3$, about 120 microfarads in this exemplary embodiment, are preferably chosen so as to allow motor current flowing through inductors L7, L8 and L9 to be absorbed when output contactor 24 is suddenly opened. If these capacitors are not properly sized, the voltage at the output of rectifier 70 would increase to a point wherein diodes DI–D6 may fail.

Figure 3:
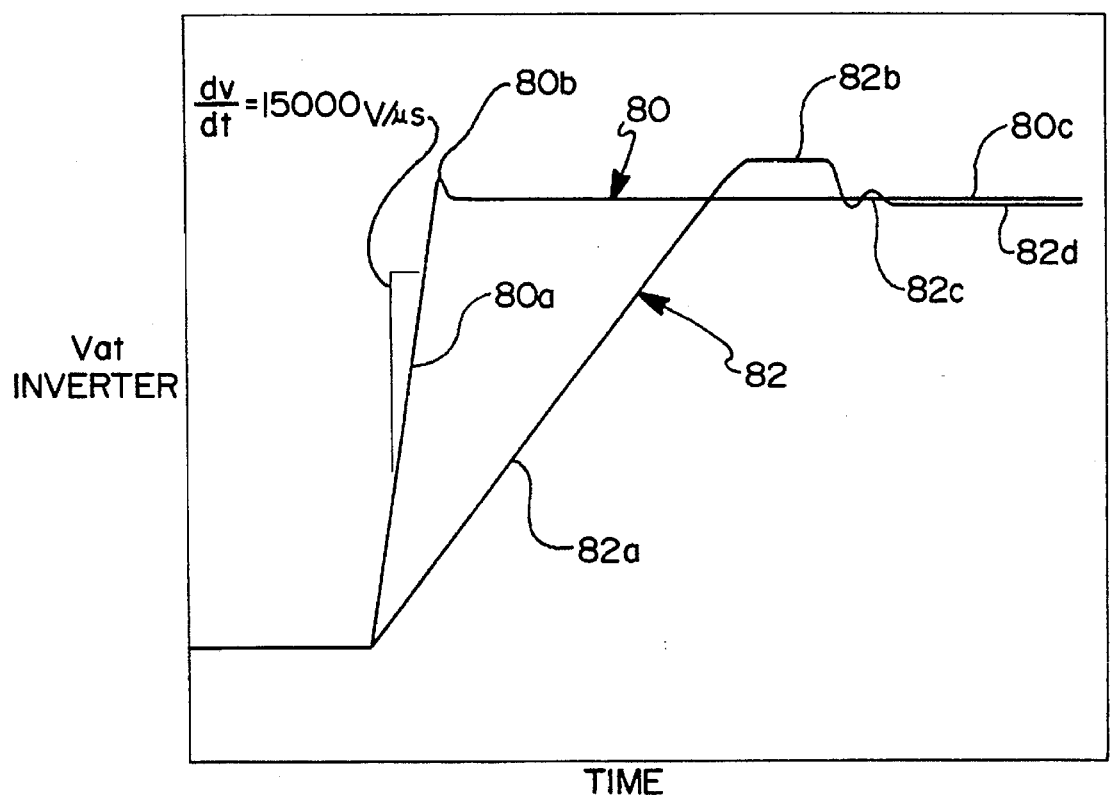
FIG. 3 graphically illustrates the voltage prior to the motor cable with and without the circuit of the present invention.

Referring now to FIG. 3, the voltage at cable 16 is plotted with respect to time. Curve 80 represents the voltage which would be seen directly from inverter 12, without the benefit of limiting circuit 10. Curve 82 conversely shows the voltage output from limiting circuit 10. Curve 80 includes three main segments, an increasing segment 80a, a peak 80b and a leveled off portion 80c. As illustrated in the figure, curve segment 80a has a fairly steep slope, indicative of a sharp voltage rise rate, up to and exceeding 15,000 volts/μsec.

It is apparent, however, that the slope of segment 82a corresponding to the signal as conditioned by limiting circuit 10, is much more gradual, reduced to only 500 to 1500 volts/μsec. Curve 82, though, has a peak voltage 82b slightly above that of 80b, due to the voltage drop in R1 and R2 causing the voltage on C7 to exceed the dc bus voltage 52, but then levels off after a brief oscillation at 82c to voltage 82d.

Figure 4:
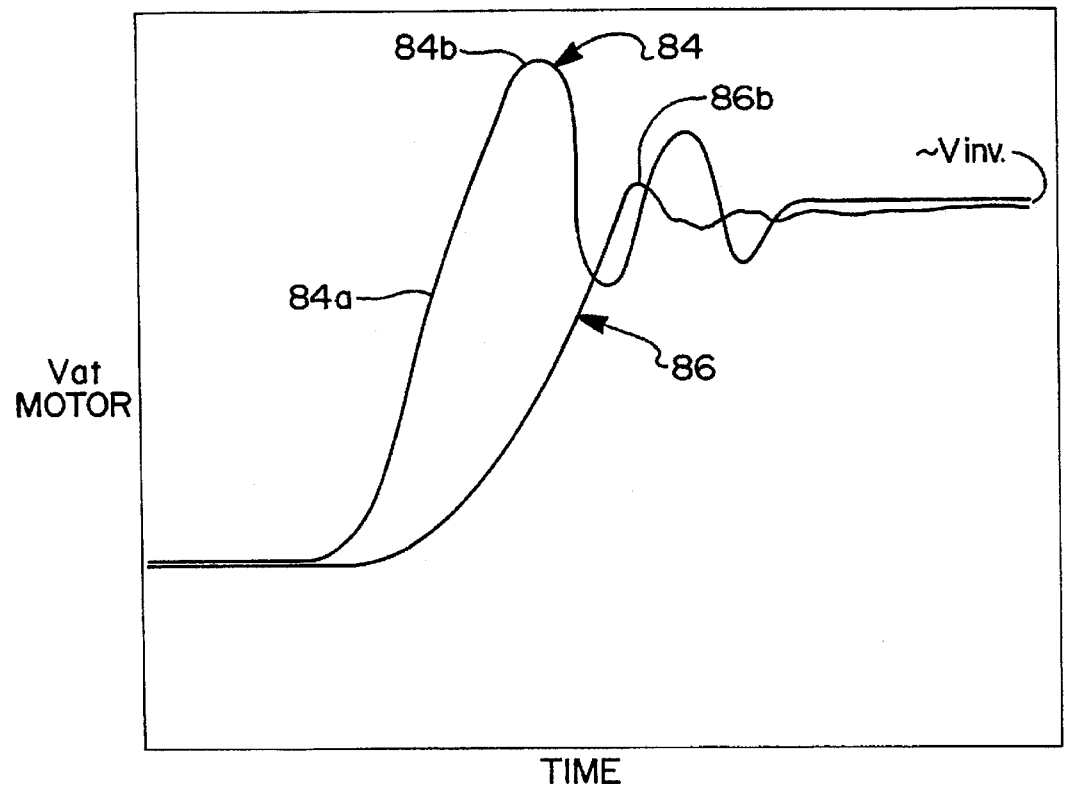
FIG. 4 is a graph similar to FIG. 3 showing the voltage applied to the controlled motor.

FIG. 4 plots the voltage applied to motor 14, further taking into consideration the distributed capacitances and inductances inherent in cable 16. Curve 84 illustrates this voltage without benefit of limiting circuit 10 and curve 86 with circuit 10. As shown therein curve 86 substantially mirrors curve 84 but on a more gradual and narrower scale. While voltage peaks at point 84b, after a sharp increase along curve portion 84a, at up to twice the inverter voltage, the peak voltage at 86b is only slightly more than one times the inverter voltage. In addition, the applied voltage is more stable.

Thus, the present limiting circuit reduces the risk of detrimental high voltage peaks and rise rates to an inverter-driven induction motor. The circuit is simple, inexpensive and readily implemented in existing motor/drive systems.

For the sake of clarity, the values of the electrical components used in one exemplary embodiment of the present invention were omitted from FIG. 1. For completeness, they are included herebelow for limiting voltage rise rated to 500 volts/μsec in a 20 horsepower motor, the values of capacitors C1–C3 and inductors L1–L6 being dependent upon the length and electrical characteristics of cable 16. However, it should be readily apparent to one of skill in the art that these component values will change with horsepower and the desired voltage rise rate limit.

| Resistors | Capacitors | Inductors | Diodes |
|---|---|---|---|
| R1 20Ω | C4 10,000pF | L7 130μH | D1 BY329-1200 |
| R2 20Ω | C5 10,000pF | L8 130μH | D2 BY329-1200 |
| (R1 and | C6 10,000pF | L9 130μH | D3 BY329-1200 |
| R2 are | $C7_1$ .1μF | | D4 BY329-1200 |
| 100 Watt) | $C7_2$ 120μF | | D5 BY329-1200 |
| | $C7_3$ 120μF | | D6 BY329-1200 |

The foregoing discussion discloses and describes an exemplary embodiment of the present invention. One skilled in the art will readily recognize from such discussion, and from the accompanying drawings and appended claims, that certain changes, modifications and variations can be made therein without departing from the spirit and scope of the present invention as defined in the following claims.

What is claimed is:

1. A voltage limiting circuit for use with an inverter-driven induction motor system, said limiting circuit being electrically coupled between said inverter and motor and comprising:

a plurality of input lines for receiving an ac electrical signal from said inverter;

a plurality of inductors, at least one said inductor connected on each said input line;

a rectifier having a plurality of output lines adapted to return dc signals to said inverter; and a plurality of capacitors connected in a delta configuration between said inductors and said rectifier.

2. The circuit of claim 1 wherein each said rectifier output line includes a resistor.

3. The circuit of claim 2 further comprising a capacitance connected across said rectifier output lines.

4. The circuit of claim 3 wherein said capacitance is created by a plurality of capacitors.

5. The circuit of claim 1 wherein said inverter includes at least one insulated gate bipolar transistor (IGBT).

6. The circuit of claim 1 wherein said rectifier includes a plurality of diodes.

7. The circuit of claim 6 wherein each said node is electrically coupled between a pair of diodes and each pair of diodes is connected in parallel.

* * * * *